United States Patent
Brimijoin, II et al.

(10) Patent No.: US 11,290,837 B1
(45) Date of Patent: Mar. 29, 2022

(54) AUDIO SYSTEM USING PERSISTENT SOUND SOURCE SELECTION FOR AUDIO ENHANCEMENT

(71) Applicant: Facebook Technologies, LLC, Menlo Park, CA (US)

(72) Inventors: William Owen Brimijoin, II, Kirkland, WA (US); Nils Thomas Fritiof Lunner, Redmond, WA (US); Nava K. Balsam, Woodinville, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/078,335

(22) Filed: Oct. 23, 2020

(51) Int. Cl.
*H04S 7/00* (2006.01)

(52) U.S. Cl.
CPC .................................. *H04S 7/303* (2013.01)

(58) Field of Classification Search
None
See application file for complete search history.

(56) References Cited

U.S. PATENT DOCUMENTS

| | | | |
|---|---|---|---|
| 10,555,106 B1 | 2/2020 | Mehra | |
| 10,959,037 B1 | 3/2021 | Mehra | |
| 2010/0315482 A1* | 12/2010 | Rosenfeld | H04S 7/303 |
| | | | 348/14.08 |
| 2012/0163606 A1* | 6/2012 | Eronen | H04S 7/302 |
| | | | 381/22 |
| 2013/0300648 A1* | 11/2013 | Kim | G06F 3/013 |
| | | | 345/156 |
| 2015/0088500 A1* | 3/2015 | Conliffe | H04R 1/10 |
| | | | 704/235 |
| 2015/0230026 A1 | 8/2015 | Eichfeld et al. | |
| 2015/0249898 A1 | 9/2015 | Horbach | |
| 2015/0341734 A1* | 11/2015 | Sherman | H04R 1/406 |
| | | | 381/92 |
| 2016/0080874 A1 | 3/2016 | Fullam | |
| 2016/0249141 A1* | 8/2016 | Verdooner | H04S 7/303 |

(Continued)

OTHER PUBLICATIONS

Ohlenforst, B. et al. "Impact of SNR, Masker Type and Noise Reduction Processing on Sentence Recognition Performance and Listening Efforts as Indicated by the Pupil Dilation Response." Hearing Research, vol. 365, Aug. 2018, pp. 90-99.

(Continued)

*Primary Examiner* — Qin Zhu
(74) *Attorney, Agent, or Firm* — Fenwick & West LLP

(57) ABSTRACT

A system that uses persistent sound source selection to augment audio content. The system comprises one or more microphones coupled to a frame of a headset. The one or more microphones capture sound emitted by sound sources in a local area. The system further comprises an audio controller integrated into the headset. The audio controller receives sound signals corresponding to sounds emitted by sound sources in the local area. The audio controller further updates a ranking of the sound sources based on eye tracking information of the user. The audio controller further selectively applies one or more filters to the one or more of the sound signals according to the ranking to generate augmented audio data. The audio controller further provides the augmented audio data to a speaker assembly for presentation to the user.

17 Claims, 7 Drawing Sheets

(56) References Cited

U.S. PATENT DOCUMENTS

2017/0374486 A1* 12/2017 Killham ................. G06F 3/013
2021/0160645 A1* 5/2021 Olivieri ................ G06T 19/003

OTHER PUBLICATIONS

Wendt, D. et al. "Toward a More Comprehensive Understanding of the Impact of Masker Type and Signal-to-Noise Ratio on the Pupillary Response while Performing a Speech-in-Noise Test." Hearing Research, vol. 369, Nov. 2018, pp. 67-79.

* cited by examiner

500

```
┌─────────────────────────────────────────────────────────────┐
│ Receive sound signals corresponding to sounds from sound    │
│ sources in a local area                                     │
│                          510                                │
└─────────────────────────────────────────────────────────────┘
                              │
                              ▼
┌─────────────────────────────────────────────────────────────┐
│ Update a ranking of the sound sources based on eye tracking │
│ information of a user                                       │
│                          520                                │
└─────────────────────────────────────────────────────────────┘
                              │
                              ▼
┌─────────────────────────────────────────────────────────────┐
│ Selectively apply one or more filters to one or more of the │
│ sound signals according to the ranking to generate          │
│ augmented audio data                                        │
│                          530                                │
└─────────────────────────────────────────────────────────────┘
                              │
                              ▼
┌─────────────────────────────────────────────────────────────┐
│ Provide the augmented audio data to a speaker assembly      │
│                          540                                │
└─────────────────────────────────────────────────────────────┘
```

FIG. 5

AUDIO SYSTEM USING PERSISTENT SOUND SOURCE SELECTION FOR AUDIO ENHANCEMENT

FIELD OF THE INVENTION

This disclosure relates generally to generating audio content, and more specifically to an audio system that uses persistent sound source selection to augment audio content.

BACKGROUND

In environments with multiple sound sources, a listener may encounter trouble tuning into a particular sound source while tuning out sound from other sound sources. For example, in a busy room with multiple people speaking at the same time, it can be difficult for a listener to discern the words of a particular speaker over the sounds of the other speakers in the room. This phenomenon is known as the cocktail party problem. Audio systems that utilize a gaze of the listener and enhance sound emitted by any sound source the listener is looking at can help with intelligibility, but require the lister to continue to fixate on the sound source of interest, thus failing to consider natural behavioral tendencies of the listener to gaze at various other objects and/or sound sources during an interaction with a particular sound source.

SUMMARY

An audio system on a headset identifies one or more sound sources as being of interest to a user in a local area. The sound sources may be ranked by the audio system based in part on eye tracking information of the user. The audio system selectively applies one or more filters to one or more sound signals corresponding to the ranked sound sources prior to the sound signals being presented as audio content (e.g., re-broadcast) to the user. In order to compensate for any difficulties the user may be experiencing in hearing (or tuning into) a particular sound source of interest (e.g., a currently highest-ranked sound source), one or more sound signals in the audio content emitted by the particular sound source and other sound sources may be enhanced and/or attenuated by the one or more filters to create augmented audio data. The audio system allows for the ranking of the sound sources to remain unchanged unless certain conditions are met. Thereby, providing a persistence to the ranking of the sound sources.

In some embodiments, the one or more filters selectively applied to the one or more sound signals may be applied to suppress sound. For example, the one or more filters may be used to suppress audio content from one or more sound sources in the local area that are not of interest to the user (e.g., fans, people talking in the background, other background noise, etc.).

In some embodiments, the headset presents the augmented audio data (e.g., the enhanced and/or suppressed sound signals) to the user via a speaker assembly on the headset. In some embodiments, the headset provides the augmented audio data to one or more in-ear devices that are communicatively coupled to the headset, and the one or more in-ear devices present the augmented audio data to the user. In some embodiments, the headset provides the one or more filters to the one or more in-ear devices and the one or more in-ear devices apply the one or more filters to the one or more sound signals to generate the augmented audio data, and then present the augmented audio data to the user.

In some embodiments, a method is described for augmenting audio data for presentation to a user. The method includes receiving sound signals corresponding to sounds from sound sources in a local area. The method further includes updating a ranking of the sound sources based on eye tracking information of the user. The method further includes selectively applying one or more filters to one or more of the sound signals according to the ranking to generated augmented audio data. The method further includes providing the augmented audio data to a speaker assembly for presentation to the user. The augmented audio data is such that sound rebroadcast from a higher-ranked sound source is enhanced relative to sound rebroadcast from a lower-ranked sound source. In some embodiments, the speaker assembly is on the headset. In other embodiments, the speaker assembly is on the one or more in-ear devices.

In some embodiments, a system is described that augments audio data for presentation to a user. The system comprises one or more microphones coupled to a frame of a headset. The one or more microphones are configured to capture sound emitted by sound sources in a local area. The system further comprises a speaker assembly configured to present audio data to a user. The system further comprises an audio controller integrated into the headset and configured to receive sound signals, from the one or more microphones, corresponding to sounds emitted by sound sources in the local area. The audio controller is further configured to update a ranking of the sound sources based on eye tracking information of the user. The audio controller is further configured to selectively apply one or more filters to one or more of the sound signals according to the ranking to generate augmented audio data. The audio controller is further configured to provide the augmented audio data to the speaker assembly for presentation to the user. The augmented audio data is such that sound rebroadcast from a higher-ranked sound source is enhanced relative to sound rebroadcast from a lower-ranked sound source. In some embodiments, the speaker assembly is on the headset. In other embodiments, the speaker assembly is on the one or more in-ear devices. Also described are embodiments of non-transitory computer-readable storage mediums configured to store instructions for performing the methods of this disclosure.

BRIEF DESCRIPTION OF THE DRAWINGS

FIG. 5 is a flowchart illustrating a process for augmenting audio data for presentation to a user, in accordance with one or more embodiments.

Figure 1A:
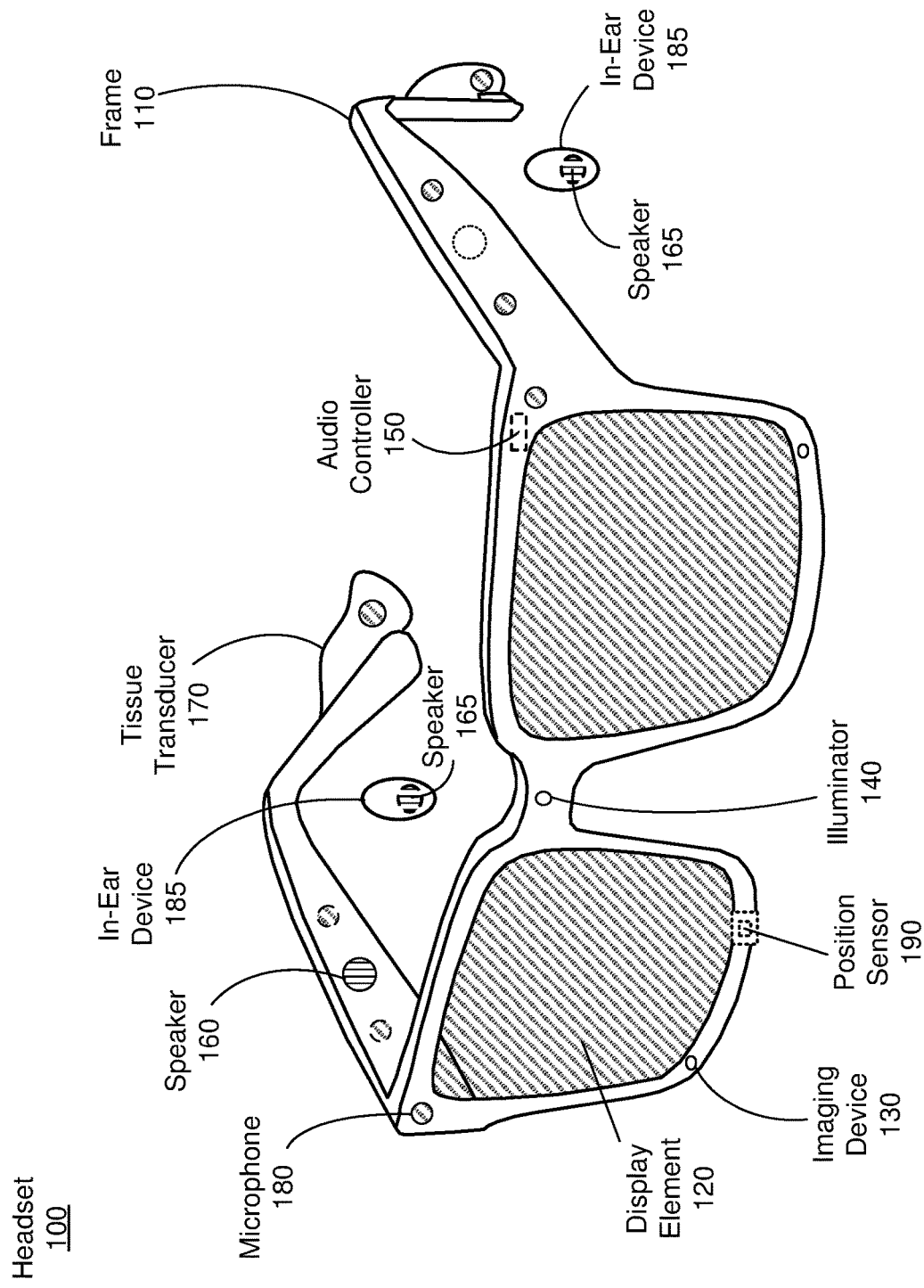
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An audio system on a headset identifies one or more sound sources in a local area as being of interest to a user. The sound sources may be ranked by the audio system based in part on eye tracking information of the user. The audio system selectively applies one or more filters to one or more sound signals prior to the sound signals being presented as audio content to the user. The audio system may apply one or more filters to sound signals corresponding to the ranked sound sources. In some embodiments, the audio system may apply one or more filters to sound signals corresponding to other sound sources in the local area. The audio system maintains the ranking of sound sources unless certain conditions (e.g., based on updated eye tracking information) are met providing a persistence in the ranking.

By the audio system selectively applying the one or more filters to one or more sound signals, augmented audio data is generated. The augmented audio data is such that sound signals corresponding to a higher-ranked sound source are enhanced relative to sound signals corresponding to a lower-ranked sound source. The augmented audio data is presented as audio content to the user and may include re-broadcast captured sound from a local area surrounding the headset, virtual sound provided by the headset, music and/or audio (e.g., from a call) provided by a mobile device (e.g., a mobile phone), or some combination thereof. The sound includes one or more sound signals where each sound signal is associated with a sound source. A sound source may be a real-world sound source, such as the user, a person, a person wearing a headset, an animal, a speaker (e.g., a speaker of an in-ear device), a mechanical device, or any other real-world object emitting sound in a local area surrounding the headset, a virtual sound source, such as a virtual object presented to the user in the local area, or a mobile device sound source, such as a mobile phone speaker, a tablet speaker, or any other mobile device speaker emitting sound in the local area.

The audio system may apply one or more filters (e.g., low pass, high pass, etc.) to one or more sound signals emitted by one or more particular sound sources (i.e., sound sources determined to be of interest to the user). The one or more filters applied to these sound signals may, e.g., amplify certain frequencies (e.g., frequencies greater than 10 kHz) of the sound signals, apply a specific gain to the sound signals, spatialize the sound signals, attenuate certain frequencies of the sound signals, equalize an intensity of certain frequencies, apply some other adjustment to the sound signals, apply a multiband limiter to certain frequencies, or some combination thereof. The filters applied to one sound signal corresponding to one sound source may differ from the filters applied to another sound signal corresponding to another sound source (e.g., based on the ranking of the sound sources). Thus, a sound signal corresponding to a higher-ranked sound source may be amplified to a greater degree than a sound signal corresponding to a lower-ranked sound source. In some embodiments, the audio system generates one or more filters to be applied to other sound signals emitted by other sound sources (i.e., sound sources determined to not be of interest to the user). The one or more filters applied to these other sound signals may decrease or eliminate the particular frequencies of those sound signals. Any or all of the filters may be dynamically adjusted as the audio content changes over time.

The audio system may identify one or more sound sources of interest to the user based in part on implicit user feedback (e.g., eye tracking information) stored in a model of the local area. The model of the local area tracks the positions, movements, and acoustics for each sound source (including the user) in the local area and stores acoustic parameters that describe the local area. In some embodiments, the audio system may identify one or more sound sources of interest based on movements (e.g., gestures performed by) of other sound sources in the local area. In some embodiments, the audio system may identify one or more sound sources of interest based on express user input.

The audio system may selectively apply the one or more filters to the one or more sound signals emitted by the sound sources. In another embodiment, the in-ear devices may apply the one or more filters to the sound signals. In some embodiments, the headset presents the augmented audio data to the user (e.g., via a speaker assembly on the headset). In some embodiments, the headset provides the augmented audio data to one or more in-ear devices that are communicatively coupled to the headset, and the one or more in-ear devices present the augmented audio data to the user.

Current audio enhancement technologies are unable to effectively determine which sound signal to enhance prior to presenting the sound signal as audio content to a user. For example, conventional audio enhancement technologies may track the user's gaze or head-pointing direction and enhance sound emitted by a sound source that intersects the user's head-pointing direction in a local area. Some work has been done to extend this gaze tracking to include eye gaze; however, these systems are not considering that the user may not continually stare at or keep their head and/or eyes pointed at a sound source of interest to them. For example, in a typical conversational setting, a user may gaze at their friend who is talking to them for a few seconds and then begin to gaze at other people or objects in the area. Requiring a user to continually stare at the sound source of interest (e.g., their friend) so that sound emitted by that sound source is effectively enhanced is not compatible with typical human behaviors. With this in mind, it is clear why conventional audio enhancement technologies generally do a poor job of isolating and enhancing sound from a sound source of interest to the user. In contrast, the audio system described herein allows for a sound source of interest to remain the sound source of interest even if the user looks away from the sound source as they are listening, thereby providing a persistence to the ranking of the sound sources. Thus, providing a better listening experience for the user that allows for more natural movements of the user.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system of the headset 100. Examples of media content include one or more images, video, audio, or some combination thereof. However, the headset 100 may also be used such that media content is presented to the user in a different manner. For example, audio content may be presented using one or both of the in-ear devices 185 worn by the user. The headset 100 includes a frame 110, and may include, among other components, a display assembly including one or more display elements 120, one or more imaging devices 130, a depth camera assembly (DCA), a position sensor 190, a passive camera assembly (PCA), an eye tracking system, and an audio system. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

Note that in some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

In some embodiments, the headset 100 may include one or more imaging devices 130 that capture visual information for the local area surrounding the headset 100. In some embodiments, the imaging devices 130 are utilized by a depth camera assembly (DCA). The DCA determines depth information for a portion of a local area surrounding the headset 100. The DCA includes the one or more imaging devices 130 and a DCA controller (not shown in FIG. 1A) and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The position sensor 190 generates one or more measurement signals and estimates positional information about the headset 100. The positional information may include a position of the headset 100 in the local area, an orientation of the headset 100 (a head-pointing direction), a velocity of the headset 100, or some combination thereof. The positional information of the headset 100 worn by the user corresponds to positional information about the head of the user. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more imaging devices 130 (e.g., RGB cameras) that capture images of some or all of the local area. In some embodiments, the imaging devices 130 may be placed on an exterior surface of the headset 100, separate from the headset 100 (e.g., part of some other device), or some combination thereof. The images captured by the PCA and the depth information determined by the DCA may be used to determine positional information about one or more sound sources in the local area (i.e. where each sound source is located within the local area), generate a model of the local area that includes the position of each sound source, update the model of the local area over time (i.e., update the model as one or more sound sources change position), or some combination thereof. Furthermore, the position sensor 190 tracks the position (e.g., location, orientation, and velocity) of the headset 100 in the model of the local area. In some embodiments, the model of the local area is stored in the headset (e.g., in the audio system), in an external system (e.g., a mapping server), in a mobile device, or in any combination thereof.

In some embodiments, the PCA may use an object recognition model to identify a type of sound source for each real-world sound source in the local area. A type of sound source is a classification of the entity emitting sound in the local area. For example, the PCA may use object recognition to identify the type of a real-world sound source to be, e.g., a person, a person wearing a headset, a speaker, an animal, a mechanical device, some other real-world entity emitting sound in the local area, or some combination thereof. The PCA may update the model of the local area to include the type of each sound source. The PCA may also update the model of the local area by tracking gestures performed by each person or person wearing a headset in the local area. A gesture may include talking, looking towards the user, looking towards a different person, waving, raising a hand, handing a real-world object to the user, or some other gesture performed by the person or person wearing a headset.

In some embodiments, the PCA may capture images of the user. The images captured by the PCA of the user may be used to update the model of the local area with gestures performed by the user. A gesture performed by the user is any movement that is indicative to a command (i.e., an implicit user input). A gesture performed by the user may include, e.g., a pointing gesture with the user's hand(s), finger(s), arm(s), some other movement performed by the user indicative of a command, or some combination thereof.

In some embodiments, the headset 100 may include one or more imaging devices 130 that capture one or more images of the eye(s) of the user wearing the headset 100. In some embodiments, the imaging devices 130 are utilized by an eye tracking system to determine eye tracking information associated with an eye of the user based on the captured images. The eye tracking system may also include one or more light sources (not shown) that illuminate the eye with IR light. A light source may be, e.g., a vertical cavity emitting laser, a light emitting diode (LED), a micro-LED, some other source of infrared light IR, or some combination thereof. The one or more imaging devices 130 utilized by the eye tracking system are configured to capture images of one or both of the eyes illuminated with the IR light from the one or more light sources.

The eye tracking system may determine eye tracking information for one or both of the user's eyes using the captured images and a depth determination technique. Depth determination techniques may include, e.g., structured light, time-of-flight, stereo imaging, some other depth determination methodology familiar to one skilled in the art, etc. In some embodiments, the eye tracking sensor determines eye tracking information based upon the captured images and a model of the user's eye. The eye tracking information determined by the eye tracking system may include, e.g., gaze information, pupillometry information, or some combination thereof. The gaze of the user is a direction the user is looking at (e.g., an eye orientation of the user). The pupillometry information of the user is a pupil size and pupil reactivity. One or both of the gaze information and the pupillometry information may be used to determine where a user is directing their attention (e.g., as an implicit user input).

The eye tracking information determined by the eye tracking system may be combined with a determined position of the headset 110 (e.g., as determined using the position sensor 190), to determine the user's gaze. For example, a vector corresponding to the eye orientation of the user (which indicates the orientation of the user's eye relative to their head) can be added to a vector corresponding to the position of the headset (indicating the location and orientation of the headset within the local area) to determine a vector corresponding to the gaze of the user (indicating a direction the user is looking at in the local area). The model of the local area may include the gaze vector of the user. In some embodiments, the model of the local area may include a history of mapped gave vectors for the user. By determining the gaze of the user, a direction that the user is looking at in the local area is identified, which can, in combination of knowledge of the positions of other sound sources in the local area (e.g., as determined by the audio system), allow for a determination as to which of the sound sources the user is looking towards.

In some embodiments, the eye tracking system may receive one or more images from the PCA depicting the local area within a field of view of the one or more imaging devices 130 utilized by the PCA and maps the determined gaze to a location within the received image. The model of the local area may be updated to include the determined gaze.

The audio system provides audio content to the user via the headset 100 and/or via the in-ear devices 185. The audio system includes a microphone array, an audio controller 150, and a transducer array. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server. The form-factor of the audio system is small similar to an in-ear device form-factor, such that the audio system is not cumbersome on the headset 100.

The microphone array detects sounds from sound sources in the local area of the headset 100. The microphones 180 capture sounds emitted from one or more real-world sound sources in the local area (e.g., a room). The microphone array includes a plurality of microphones 180. The microphones 180 may be acoustic wave sensors, sound transducers, or similar sensors that are suitable for detecting sounds. The number and/or locations of microphones 180 may be different from what is shown in FIG. 1A. For example, the number of microphone locations may be increased to increase the amount of audio information collected and the sensitivity and/or accuracy of the information. The microphone locations may be oriented such that the microphone 180 is able to detect sounds in a wide range of directions surrounding the user wearing the headset 100. Each microphone 180 is configured to detect sound and convert the detected sound into an electronic format (analog or digital). In some embodiments, the microphones 180 may be placed on an exterior surface of the headset 100, placed on an interior surface of the headset 100, separate from the headset 100 (e.g., part of some other device), or some combination thereof.

The transducer array of the headset 100 may provide one or more sound signals to the user in accordance with instructions from the audio controller 150. For example, the transducer array of the headset 100 may present augmented audio data to the user in accordance with instructions from the audio controller. The transducer array includes a plurality of transducers. A transducer may be a speaker 160 or a tissue transducer 170 (e.g., a bone conduction transducer or a cartilage conduction transducer). The number and/or locations of speakers 160 may be different from what is shown in FIG. 1A. For example, the speakers 160 may be enclosed in the frame 110 of the headset 100. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The audio controller 150 controls operation of the audio system. The audio controller 150 may comprise a processor and a computer-readable storage medium. In some embodiments, the audio controller 150 may identify one or more sound sources (real-world sound sources or virtual sound sources) in the local area as sound sources of interest to the user. In some embodiments, the audio controller 150 identifies a sound source of interest by which type the sound source is identified as in the model of the local area, by the tracked gestures of sound sources in the model of the local area, by the received sound signals corresponding to sounds from the sound sources, or some combination thereof. In some embodiments, the audio controller 150 identifies a sound source as a sound source of interest by monitoring implicit user input (e.g., eye tracking information or tracked gestures of the user) stored in the model of the local area and/or by monitoring express user input (e.g., a verbal cue provided by the user). The identification of sound sources of interest to the user by the audio controller 150 is described further in FIG. 2.

The audio controller 150 ranks the sound sources in the local area that have been identified as sound sources of interest to the user. In some embodiments, there may be a fixed ranking (e.g., up to specified number of sound sources may be ranked at any given time, up to a specified number of sound sources may be ranked in each rank, etc.). In some embodiments, the audio controller 150 generates the ranking of the sound sources of interest to the user based on eye tracking information of the user determined by the eye tracking system and stored in the model of the local area. In some embodiments, the audio controller 150 updates the ranking of the sound sources of interest as updated eye tracking information is determined by the eye tracking system and stored in the model of the local area. In some embodiments, the audio controller 150 updates the ranking of the sound sources of interest when a previously highest-ranked sound source emits sound. The generation and updating of the ranking of sound sources of interest to the user is described further in FIGS. 2 and 3.

The audio controller 150 may selectively apply one or more filters to one or more of the sound signals according to the ranking to generate augmented audio data. The one or more filters may be applied to, e.g., a sound signal corresponding to sound emitted by the ranked sound sources, a sound signal corresponding to a sound emitted by other non-ranked sound sources, or some combination thereof. In some embodiments, the one or more filters may enhance (e.g., by amplifying certain frequencies, by equalizing the audio, etc.) sound signals corresponding to sound emitted by the higher-ranked sound sources relative to lower-ranked sound sources. In some embodiments, the audio controller 150 may apply filters that attenuate sound signals differently based on the ranking of the corresponding sound sources. For example, a filter may attenuate the sound signal corresponding to a second highest-ranked sound source by −8 dB and attenuate the sound signal corresponding to a third highest-ranked sound source by −12 dB. In some embodiments, the audio controller 150 may apply one or more filters that suppress (e.g., by filtering out certain frequencies) one or more sound signals corresponding to sound emitted by one or more other sound sources in the local area. For example, the audio controller 150 may apply filters to suppress one or more sound signals that correspond to sounds emitted by one or more sound sources determined to not be of interest to the user. The augmented audio data includes the one or more sound signals post-filter application. The application of one or more filters by the audio controller 150 is described further in FIGS. 2 and 3.

In some embodiments, the audio controller 150 provides instructions to the in-ear devices 185 to apply the one or more filters to the sound signals to generate the augmented audio data.

In some embodiments, the in-ear devices 185 provide the augmented sound data to the user in accordance with instructions from the audio controller 150. The in-ear devices 185 may include a communication unit (not shown) and a speaker 165. The in-ear devices 185 are worn by the user (e.g., placed in the respective ear canals of the user) and may present the augmented sound signal to the user via the speakers 165. In some embodiments, the in-ear devices 185 are hearing aids that are communicatively coupled to the headset 100. In some embodiments, the in-ear devices 185 apply the one or more filters to the sound signal to generate the augmented sound data in accordance with instructions from the audio controller 150. The in-ear devices 185 may then present the augmented sound data to the user via the speakers 165. While FIG. 1A illustrates an in-ear device 185 for each ear of the user, in other embodiments there may be just a single in-ear device 185 for one ear and no in-ear device for the other ear.

Additional details regarding the audio system are discussed below in FIG. 2 and additional details regarding the components of the headset 100 are discussed below in connection with FIG. 6.

Figure 1B:
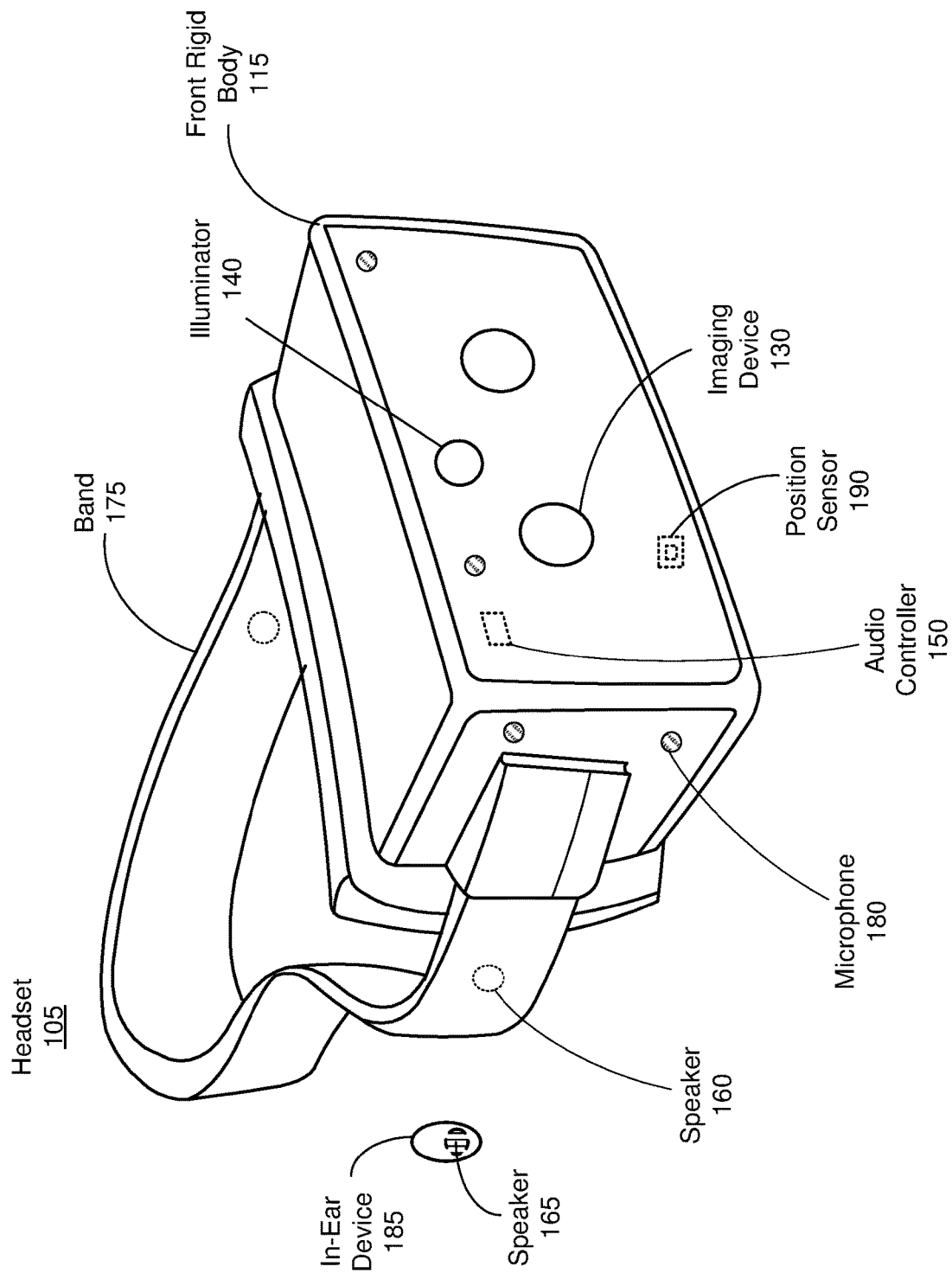
FIG. 1B is a perspective view of a headset implemented as a head-mounted display, in accordance with one or more embodiments.

FIG. 1B is a perspective view of a headset 105 implemented as an HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A but modified to integrate with the HMD form factor. For example, the HMD includes one or more imaging devices 130, a depth camera assembly (DCA), a position sensor 190, a passive camera assembly (PCA), an eye tracking system, and an audio system. FIG. 1B shows the illuminator 140, a plurality of the speakers 160, a plurality of microphones 180, and an in-ear device 185 with speaker 165. While FIG. 1B illustrates an in-ear device 185, in other embodiments there may be two in-ear devices 185 one for each ear.

Figure 2:
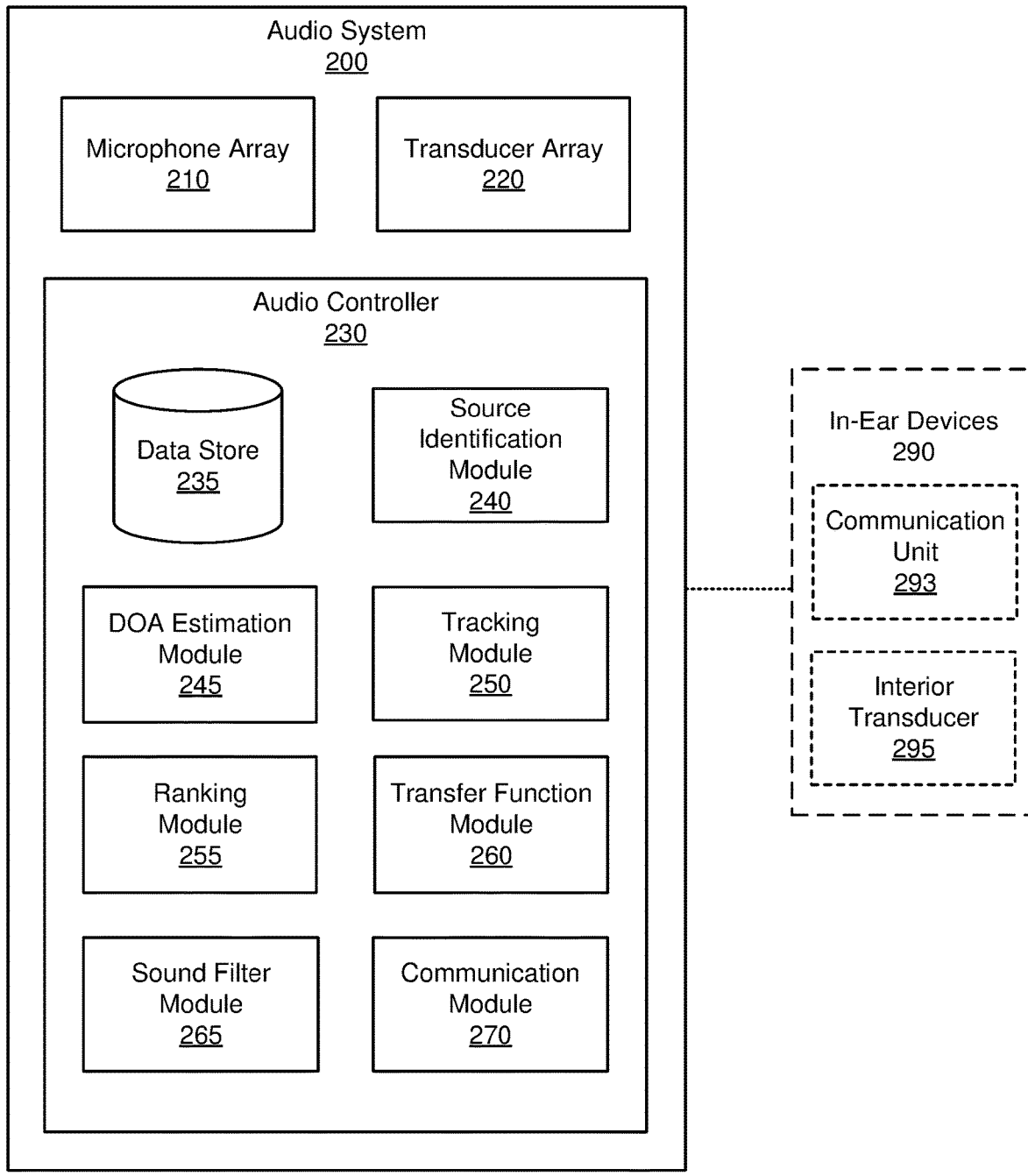
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. In the embodiment of FIG. 2, the audio system 200 includes a microphone array 210, a transducer array 220, and an audio controller 230. In some embodiments, the audio system 200 also includes the in-ear devices 290. Some embodiments of the audio system 200 have different components than those described here. Similarly, in some cases, functions can be distributed among the components in a different manner than is described here. At least a portion of the audio system 200 is integrated into a headset, and in some cases, audio system 200 may also include the in-ear devices 290. Additionally, functionality described in conjunction with one or more of the components shown in FIG. 2 may be distributed amongst one or more external components. For example, some or all of the functionality of the audio controller 230 may be performed by a connected mobile device (e.g., a mobile phone).

The microphone array 210 captures sound within a local area surrounding the microphone array 210. The microphone array 210 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on the in-ear devices 270, some other connected device (e.g., a mobile phone), or some combination thereof. An acoustic sensor may be, e.g., a microphone, a vibration sensor, an accelerometer, or any combination thereof. By increasing the number of acoustic sensors, the accuracy of information (e.g., directionality) describing a sound field produced by any of the sound sources may be improved.

The microphone array 210 may capture sounds emitted by one or more real-world sound sources within the local area. The captured sounds may include a plurality of sound signals (i.e., a sound signal for each sound source which may include sound that corresponds to the user). The sound signals are provided to the audio controller 230 for further processing such as the selective application of one or more filters to the one or more sound signals to generate augmented audio data prior to presenting the augmented audio data as audio content to the user.

In some embodiments, the transducer array 220 provides audio data as audio content to the user. The transducer array 220 includes a plurality of transducers. A transducer may be, e.g., a speaker (e.g., the speaker 160), a tissue transducer (e.g., the tissue transducer 170), some other device that presents the audio data as audio content to the user, or some combination thereof. A tissue transducer may be configured to function as a bone conduction transducer or a cartilage conduction transducer. The transducer array 220 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 220 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of the headset and may be configured to be behind the auricle coupled to a portion of the user's skull. The bone conduction transducer receives vibration instructions from the audio controller 230 and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of the headset and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 220 may present augmented audio data as audio content to the user, the in-ear devices 290 may present the augmented audio data as audio content to the user, or some combination thereof in accordance with instructions provided by the audio controller 230.

The in-ear devices 290 may be embodiments of the in-ear devices 185 in FIG. 1A or FIG. 1B. Each in-ear device 290 includes at least a communication unit 293 and an interior transducer 295. In some embodiments, one or more in-ear devices 290 may include a battery, an exterior transducer, an in-ear audio controller, an exterior microphone, an interior microphone, some other components not discussed here, or some combination thereof. In some embodiments, one or more of the in-ear devices 290 may be, e.g., earbuds that are communicatively coupled to the audio system 200. The communication unit 293 includes a receiver, and in some embodiments may also include a transmitter. In some embodiments, the communication unit 293 may provide sounds captured by the exterior microphone and/or interior microphone to the audio controller 230. The communication unit 293 may receive instructions from the audio controller 230. The instructions may include one or more filters to apply to one or more sound signals and/or the augmented audio data. In some embodiments, the in-ear audio controller may apply the one or more filters to the one or more sound signals to generate the augmented audio data. The interior transducer 295 presents the augmented audio data to the user. Each in-ear device 290 is configured to be fit within the ear canal of the user so that it at least partially occludes the ear canal.

The audio controller 230 controls operation of the audio system 200. In the embodiment of FIG. 2, the audio controller 230 includes a data store 235, a source identification module 240, a DOA estimation module 245, a tracking module 250, a ranking module 255, a transfer function module 260, a sound filter module 265, and a communication module 270. The audio controller 230 may be located inside a headset, in some embodiments. Some embodiments of the audio controller 230 have different components than those described here. Similarly, functions can be distributed among the components in different manners than described here. For example, some functions of the audio controller 230 may be performed external to the headset.

The data store 235 stores data for use by the audio system 200. Data in the data store 235 may include sounds recorded in the local area of the audio system 200, direction of arrival (DOA) estimates, sound source locations, head-related transfer functions (HRTFs), transfer functions for one or more sensors, array transfer functions (ATFs) for one or more of the acoustic sensors, a model of the local area, user input (e.g., express user input and/or implicit user input), a sound profile of the user, sound source rankings, sound filters, sound signals, other data relevant for use by the audio system 200, or any combination thereof.

The model of the local area tracks the positions, movements, acoustics, and other characteristics for each sound source (including the user) in the local area and stores acoustic parameters that describe the local area. The model of the local area may include positional information about the user (e.g., a location, an orientation, and/or a velocity of the user in the local area), movement information about the user (e.g., eye tracking information about the user and/or gestures performed by the user), and acoustic information about the user (e.g., one or more filters for enhancing or suppressing a sound emitted by the user). The model of the local area may also include positional information about the sound sources (e.g., a location of each sound source in the local area), type information about some or all of the sound sources (e.g., a sound source is a person, a sound source is a virtual object, etc.), and movement information about the sound sources (e.g., gestures performed by the sound sources). The model of the local area may also include acoustic parameters (e.g., reverberation time) that describe acoustic properties of the local area. The model of the local area may also include a history of presented virtual content (e.g., locations of virtual sound sources within the local area over time, virtual sound presented to the user over time, and so on). In some embodiments, the audio system updates the model of the local area with updated information about the user, updated information about the sound sources, updated information about the local area over time, or some combination thereof.

The source identification module 240 is configured to identify one or more sound sources in the local area as sound sources of interest to the user. The sound sources of interest may be real-world sound sources or virtual sound sources. The source identification module 240 may identify the one or more sound sources of interest each time a user enters new local area. In some embodiments, the source identification module 240 may identify a new sound source of interest when a new sound source enters the local area. In some embodiments, the source identification module 240 may identify a new sound source of interest when a previously identified sound source not of interest to the user becomes of interest to the user.

The source identification module 240 may identify the sound sources of interest based in part on implicit user input stored in the model of the local area and/or express user input provided directly by the user. For example, the model of the local area includes positional information about the user, positional information about the sound sources, and implicit user input (e.g., eye tracking information for the user). The source identification module 240 determines that a gaze vector of the user is within a distance threshold (e.g., 2 degrees, 5 degrees, 0.25 meters, 0.5 meters, etc.) of a particular sound source location for a threshold amount of time (e.g., 1.5 seconds, 2 second, etc.). Based on this determination, the source identification module 240 determines the particular sound source is a sound source of interest to the user.

In another example, the model of the local area includes positional information about the sound sources and tracked gesture information (i.e., implicit user input) about the user. Based on an identified gesture (e.g., pointing a finger at) performed by the user directed to a location within a distance threshold of a particular sound source location, the source identification module 240 may determine the particular sound source being pointed at by the user is a sound source of interest to the user. In some embodiments, the source identification module 240 may determine a sound source of interest based on express user input. For example, an express user input may be a verbal cue provided by the user (e.g., saying which sound source(s) should be sound sources of interest) captured by the microphone array, may be a button press performed by the user on an input device communicatively coupled to the audio system 200 via the communication module 270 that identifies the sound sources of interest, or some other express user input.

The source identification module 240 may determine one or more sound sources of interest to the user based on sound source type and/or tracked gestures performed by the sound sources. In some embodiments, the model of the local area includes type information for the sound source as determined by a PCA integrated on the headset. For example, each sound source is associated with a type, such as person, person wearing a headset, speaker, animal, mechanical device, etc. In some embodiments, the source identification module 240 may monitor tracked gestures associated with sound sources of type person or person wearing a headset to determine one or more sound sources of interest to the user. The tracked gestures are included in the model of the local area. For example, one or more people in the local area may turn their heads and/or torsos towards a particular sound source in the local area. This particular sound source may be identified as a sound source of interest to the user.

The DOA estimation module 245 is configured to localize sound sources in the local area based in part on captured sound from the microphone array 210. Localization is a process of determining where sound sources are located relative to the user of the audio system 200. The DOA estimation module 240 performs a DOA analysis to localize one or more sound sources within the local area and update the model of the local area accordingly. The DOA analysis may include analyzing the intensity, spectra, and/or arrival time of each sound at the microphone array 210 to determine the direction from which the sounds originated. In some cases, the DOA analysis may include any suitable algorithm for analyzing a surrounding acoustic environment in which the audio system 200 is located.

For example, the DOA analysis may be designed to receive input signals from the microphone array 210 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the microphone array 210 received the direct-path audio signal. The determined angle may then be used to identify the DOA for the received input signal. Other algorithms not listed above may also be used alone or in combination with the above algorithms to determine DOA.

The tracking module 250 is configured to track locations of one or more sound sources. The tracking module 250 may compare current DOA estimates and compare them with a stored history of previous DOA estimates. In some embodiments, the audio system 200 may recalculate DOA estimates on a periodic schedule, such as once per second, or once per millisecond. The tracking module 250 may compare the current DOA estimates with previous DOA estimates, and in response to a change in a DOA estimate for a sound source, the tracking module 250 may determine that the sound source moved. In some embodiments, the tracking module 250 may detect a change in location based on visual information received from the headset (e.g., from a DCA and/or a PCA) or some other external source. The tracking module 250 may track the movement of one or more sound sources over time. The tracking module 250 may store values for a number of sound sources and a location of each sound source at each point in time in the model of the local area. In response to a change in a value of the number or locations of the sound sources, the tracking module 250 may determine that a sound source moved, and the model of the local area is updated accordingly. The tracking module 250 may calculate an estimate of the localization variance. The localization variance may be used as a confidence level for each determination of a change in movement.

The ranking module 255 is configured to update a ranking of the sound sources of interest to the user. The ranking of the sound sources of interest is a fixed ranking. A fixed ranking is a ranking that includes a finite and fixed number of potential ranks for sound sources. A fixed ranking may include for example three potential ranks, where each rank is associated with a different level of enhancement. There may be multiple sound sources of the same rank. For example, there may be a single rank one sound source of interest and multiple sound sources of interest of rank two and/or three. And as described below, under certain circumstances there may be multiple rank one sources as well. In other embodiments, there may be more or less potential ranks.

The ranking module 255 may determine to update the ranking of the sound sources of interest each time a user enters a new local area. In some embodiments, the ranking module 255 may purge the current ranking of sound sources when a user enters a new local area. As a user enters the new local area, the ranking module 255 may update the ranking based in part on implicit user input (e.g., eye tracking information) stored in the model of the local area. For example, the model of the local area includes positional information about the user, positional information about the sound sources, and eye tracking information (e.g., a gaze vector) for the user. As a user enters a new local area, the ranking module 255 monitors the gaze vector (i.e., where the user is currently directing their attention). Based on the gaze vector being within a distance threshold (e.g., 2 degrees, 5 degrees, 0.25 meters, 0.5 meters, etc.) of a particular sound source location for a threshold amount of time (e.g., 1.5 seconds, 2 second, etc.), the ranking module 255 determines the ranking of the particular sound source to be the highest rank. In some embodiments, the other sound sources present in the local area are not ranked. In some embodiments, the other sound sources are all ranked in the lowest rank.

The ranking module 255 continues to update the ranking of the sound sources based on updates to eye tracking information of the user. The gaze of the user may be tracked over time in the model of the local area. In one example, with two sound sources other than the user in the local area, the user may divert their gaze from a first sound source (i.e., a current highest rank sound source) to a second sound source. The ranking module 255 may update the ranking of the sound sources to include the first sound source and the second sound source to be of equal rank in the highest rank. The ranking module 255 may further update the ranking if the user continues to gaze at the second sound source for at least a threshold amount of time (e.g., for at least 1.5 seconds, for at least 2 seconds, etc.). If the user does gaze at the second sound source for at least the threshold amount of time, the ranking module 255 updates the ranking to include the second sound source as the highest-ranked sound source and the first sound source as the next highest-ranked sound source. The ranking module 255 may further update the ranking if the user does not continue to gaze at the second sound source for the threshold amount of time. If the user does not continue to gaze, the ranking module 255 may update the ranking to rank the second sound source in a lower rank. Thus, the ranking of sound sources is updated by the ranking module 255 only when certain conditions are met (e.g., the user continues to gaze at a different sound source than the current highest-ranked sound source) providing a persistence to the ranking of the sound sources.

In embodiments, with more than two sound sources in the local area, the ranking module 255 may update the ranking of sound sources similar to as described above with only two sound sources other than the user in the local area. The updates may be based in part on updated eye tracking information (i.e., updates to the user's gaze vector). As a new sound source (i.e., not the current highest-ranked sound source) takes over the highest-ranked position, the ranking module 255 may adjust the ranking of the other ranked sound sources by decreasing the rank of each sound source. For example, with a fixed ranking of three sound sources at a time, the ranking module 255 may decrease the rank of the highest-ranked to the next highest-ranked and the next highest-ranked to a lower rank. In some embodiments, the ranking module 255 may adjust the ranking of the other ranked sound sources by decreasing the rank of some but not all of the other ranked sound sources. For example, with a fixed ranking of three sound sources at a time, the ranking module 255 may decrease the rank of the highest-ranked to be of equal ranking with the next highest-ranked. The ranking module 255 may determine to not decrease the rank of some sound sources based on an amount of time the sound sources were previously the highest-ranked.

In some embodiments, a first type of ranking based on eye tracking information may be used by the ranking module 255 to update the ranking of the sound sources as described above. Alternatively and/or additionally, other types of ranking may be used by the ranking module 255. In some embodiments, a second type of ranking based on a previously highest-ranked sound source emitting sound may be used by the ranking module 255 to update the ranking of the sound sources. For example, the ranking module 255 may receive a sound signal from the microphone array 210 associated with a particular sound source that is currently not the highest-ranked but in the past was the highest-ranked. The ranking module 255 updates the ranking of the sound sources to include the particular sound source in the highest-rank alongside the current highest-ranked sound source (i.e., both sound sources have equal rank). The ranking module 255 may further update the ranking of sound sources based on eye tracking information. For example, the user diverts their gaze to the particular sound source within a predefined amount of time (e.g., 5 seconds, 10 second, 15 seconds, etc.) after the particular sound source emits sound, the ranking module 255 may maintain the particular sound source in the highest rank and shift the other highest-rank sound source to the next highest rank.

In some embodiments, a third type of ranking may be used by the ranking module 255 to update the ranking of the sound sources. The third type of ranking is based on one or more identified gestures of persons or persons wearing headsets in the local area. For example, the model of the local area is tracking gestures performed by other sound sources (e.g., persons or persons wearing headsets) in the local area. In one embodiment, the ranking module 255 may determine some or all of the other sound sources perform one or more gestures (e.g., turn their head towards, turn their torso towards, etc.) associated with turning their attention to a particular sound source. In some embodiments, the ranking module 255 may determine some or all of the sound sources of interest to the user perform one or more gestures associated with turning their attention to a particular source. The ranking module 255 may update the ranking of the particular sound source to either a highest-ranked position or to be equal ranking with the current highest-ranked sound source. The ranking module 255 may further update the ranking of sound sources if the user diverts their gaze to the particular sound source within a predefined amount of time (e.g., 5 seconds, 10 seconds, 15 seconds, etc.) as described above. In other embodiments, the ranking module 255 may determine one or more persons or persons wearing headsets turn their attention towards the user. The ranking module 255 may update the ranking of these particular sound sources to be higher-ranked.

In some embodiments, a fourth type of ranking based on proximity to the user may be used by the ranking module 255 to update the ranking of the sound sources. For example, a sound source of interest to the user that is within a threshold distance to the user based on the model of the local area may be ranked higher and/or may not decrease in ranking as the ranking module 255 updates the ranking as needed. In some embodiments, a fifth type of ranking based on how recent a person or person wearing a headset began talking and/or their tone may be used by the ranking module 255 to update the ranking of the sound sources. In some embodiments, a sixth type of ranking is based on a level of familiarity of the sound sources to the user. For example, the data store 235 may store a user profile that includes a listing of friends associated with the user. The ranking module 255 may update the ranking of sound sources when a friend of the user is identified as a sound source in the local area (e.g., the friend may be ranked in a higher rank or be the highest-ranked). In some embodiments, a seventh type of ranking based on a head-pointing history of the user may be used by the ranking module 255 to update the ranking of the sound sources. In some embodiments, an eighth type of ranking based on express user input (e.g., verbal cue) may be used. In some embodiments, any or all types of ranking may be used by the ranking module 255 to update a ranking of the sound sources. The ranking module 255 may weight the various types of ranking when using more than one to update. The ranking module 255 may determine an aggregate ranking of the sound sources based on a plurality of weighted types of ranking.

The transfer function module 260 is configured to generate one or more acoustic transfer functions. Generally, a transfer function is a mathematical function giving a corresponding output value for each possible input value. Based on parameters of the detected sounds, the transfer function module 260 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone (e.g. a microphone of the microphone array 210 and/or an exterior microphone of the in-ear devices 290) receives a sound from a point in space.

An ATF includes a number of transfer functions that characterize a relationship between the sound sources and the corresponding sound received by the acoustic sensors in the microphone array 210. Accordingly, for a sound source there is a corresponding transfer function for each of the acoustic sensors in the microphone array 210. And collectively the set of transfer functions is referred to as an ATF. Accordingly, for each sound source there is a corresponding ATF. The ATF for a particular sound source location relative to the microphone array 210 may differ from user to user due to a person's anatomy (e.g., ear shape, shoulders, etc.) that affects the sound as it travels to the person's ears. Accordingly, the ATFs of the microphone array 210 are personalized for each user of the audio system 200.

In some embodiments, the transfer function module 260 determines one or more HRTFs for a user of the audio system 200. The HRTF characterizes how an ear receives a sound from a point in space. The HRTF for a particular sound source location relative to a person is unique to each ear of the person (and is unique to the person) due to the person's anatomy (e.g., ear shape, shoulders, etc.) that affects the sound as it travels to the person's ears. In some embodiments, the transfer function module 260 may determine HRTFs for the user using a calibration process. In some embodiments, the transfer function module 260 may provide information about the user to a remote system. The remote system determines a set of HRTFs that are customized to the user using, e.g., machine learning, and provides the customized set of HRTFs to the audio system 200.

The sound filter module 265 selectively applies one or more filters to one or more sound signals to generate augmented audio data based on the ranking of sound sources. The sound filter module 265 receives the sound signals from the microphone array 210 and determines which sound signals correspond to the sound sources in the local area based on the model of the local area. In some embodiments, the sound filter module 265 may apply one or more filters based on the ranking of the sound sources. For example, the sound filter module 265 may apply a first filter to a sound signal corresponding to the highest-ranked sound source, a second filter to a sound signal corresponding to the next highest-ranked sound source, and a third filter to a sound signal corresponding to the lowest-ranked sound source. In some embodiment, the sound filter module may apply a filter to sound signals corresponding to sound sources not of interest to the user (i.e., sound sources not currently ranked).

In some embodiments, the one or more filters may cause one or more sound signals to be enhanced. For example, the one or more filters applied to some or all of the higher-ranking sound sources by the sound filer module 265 may enhance (amplify) the sound corresponding to those sound sources, may attenuate sound corresponding to those sound sources, or some combination thereof. The amount of enhancement and/or attenuation applied by the filters corresponds to the rank of each sound source. For example, the largest amount of enhancement may be applied to the highest rank and each lower rank is associated with a corresponding lower level of enhancement. In another example, the highest ranked sound source may not be attenuated, whereas the lower ranked sound sources are associated with higher level of attenuation.

In some embodiments, the one or more filters may filter out (i.e., decrease or eliminate) sounds associated with the sound sources not of interest to the user. In some embodiments, the sound filter module 265 may apply a filter (e.g., one or more HRTFs determined by the transfer function module 260) to better spatialize the sound signal emitted by the higher-ranking sound sources. In some embodiments, the sound filter module 265 may determine one or more filters (e.g., a multiband limiter) to prevent discomfort associated with high sound pressure levels at particular frequencies. In some embodiments, the sound filter module 265 may identify one or more filters to suppress feedback. For example, a frequency transposition filter may be identified that transposes all or certain frequency bands by a particular amount (e.g., by 5 Hz, 20 Hz, 50 Hz, etc.)

In some embodiments, the sound filter module 265 may apply one or more filters based on the sound profile of the user. The sound profile is personalized sound information about the user describing how well a user hears sounds at different frequencies. The sound profile may include information from one or more audiograms, loudness discomfort levels test results, speech-in-noise test results, spectro-temporal discrimination results, temporal fine-structure test results, cognitive performance test results, self-reported hearing abilities, some other hearing test result, or some combination thereof. For example, the sound filter module 265 may apply a filter that amplifies certain frequencies based on the sound profile of the user which included information about certain frequencies the user has trouble hearing.

In some embodiments, the sound filter module 265 applies one or more filters based on the model of the local area. The model of the local area may include acoustic parameters that describe acoustic properties of the local area. The acoustic parameters may include, e.g., a reverberation time, a reverberation level, a room impulse response, etc. In some embodiments, the sound filter module 265 calculates one or more of the acoustic parameters and stores the parameters in the model of the local area. In some embodiments, the sound filter module 265 requests the acoustic parameters from a mapping server (e.g., as described below with regard to FIG. 6) and stores the parameters in the model of the local area. The sound filter module 265 may apply one or more sound filters that decrease or eliminate the frequencies of sound emitted by sound sources not of interest to the user based on a high reverberation time of the local area.

In some embodiments, the sound filter module 265 applies one or more filters to a sound signal corresponding to sound emitted by the user. The filters applied to this sound signal adjust the sound signal such that the user's voice sounds natural to the user during any re-broadcast of the sound.

The sound filter module 265 combines the sound signals post-filter application as augmented sound data. In some embodiments, the augmented sound data may be provided to the transducer array 220 for presentation to the user. In other embodiments, the augmented sound data may be provided to the communication module 270. In some embodiments, the in-ear devices 290 apply the one or more filters to the sound signal.

The communication module 270 communicates with one or more external systems communicatively coupled to the audio system 200. The communication module 270 may include a receiver (e.g., an antennae) and a transmitter. The external systems may include, e.g., some other component of the headset, an artificial reality console, an I/O interface, a mapping server, the in-ear devices 290, etc. The communication module 270 may send and receive data related to the model of the local area with the mapping server. The communication module 270 may send data (e.g., one or more filters, the augmented sound data) and receive data (e.g., captured sound) with the communication unit 293 of the in-ear devices 290. The communication module 270 may receive data (e.g., user feedback, sound profile data of the user) from an external system (e.g., the I/O interface).

The processing and computations performed by the audio controller 230 allows for better enhancement to audio content presented to the user. For example, a user may be struggling to hear the sound sources of interest to them (e.g., the user may be suffering from hearing loss, the user may be within a local area that has a multitude of loud sound sources, or some combination of both). The user may benefit from the audio controller 230 ranking the sound sources of interest to the user based on user input, updating the ranking as the user input changes, and applying one or more filters to one or more sound signals based on the ranking. Thus, sounds emitted by sound sources of interest to the user may be enhanced (amplified) and/or sounds emitted by other sound sources not of interest to the user may be suppressed. Also, the processing and computations performed by the audio controller 230 allows the in-ear devices 290 to present enhanced audio content to the user.

Figure 3:
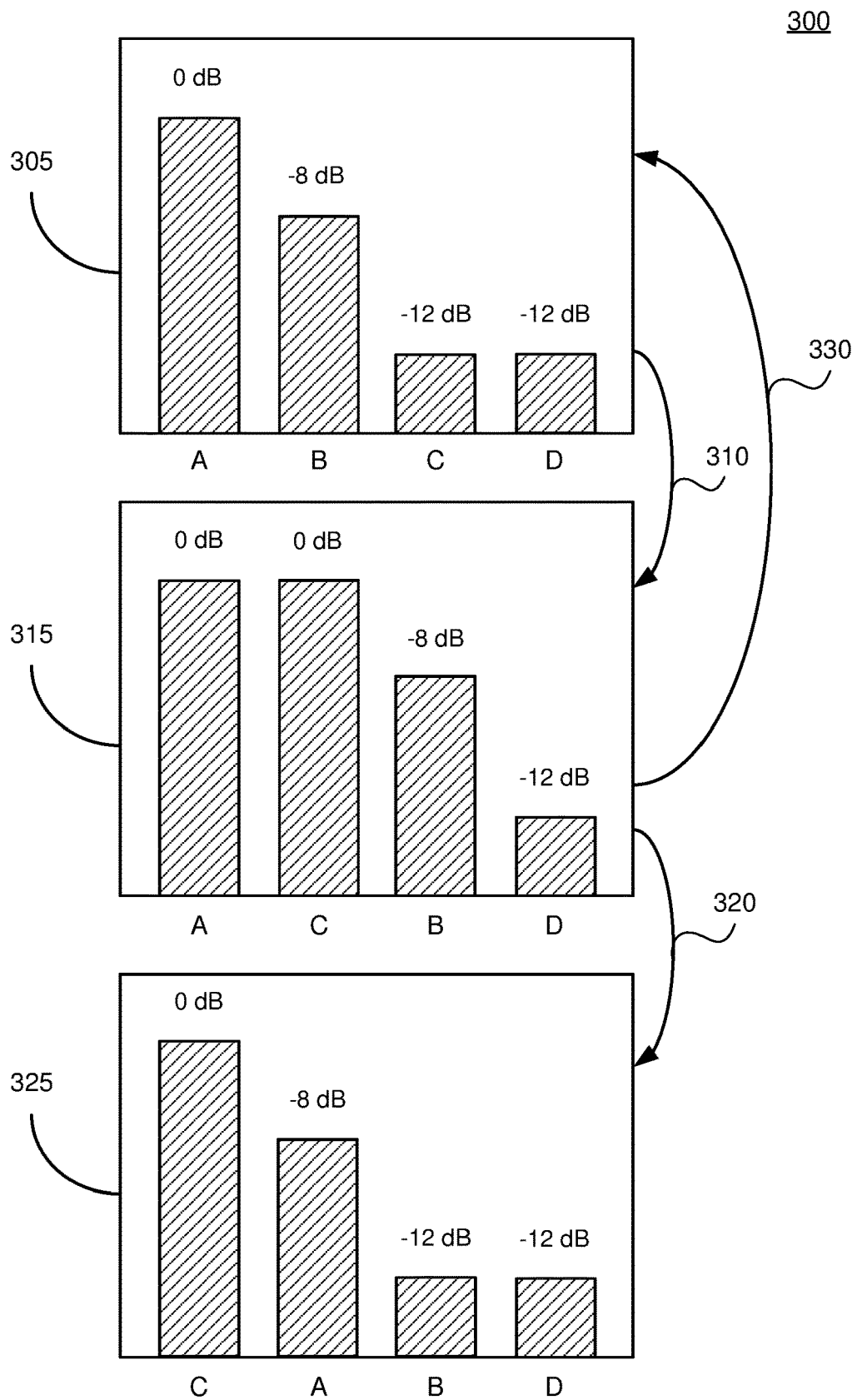
FIG. 3 is an example sound source ranking scenario, in accordance with one or more embodiments.

FIG. 3 is an example sound source ranking scenario 300, in accordance with one or more embodiments. The example scenario 300 includes three panels 305, 315, 325 illustrating three possible ranking scenarios that may take place over time. Sound sources of interest to a user include sound sources A, B, C, and D. In each panel 305, 315, 325, the sound sources A, B, C, and D are ranked in decreasing order from left to right. With each transition 310, 320, 330 between the panels 305, 315, 325, the ranking of the sound sources is updated by an audio system.

In panel 305, sound source A has the highest rank, sound source B is the next highest, and the remaining sound sources (sound source C and sound source D) have the same rank. Sound source A will have the least amount of suppression, sound source B will have some amount of suppression, and sound source C and sound source D will have the greatest amount of suppression. As such, the audio system (e.g., the audio system 200) may selectively apply one or more filters to sound signals corresponding to each sound source accordingly. For example, the audio system may apply a filter to the sound signal corresponding to sound source B attenuating the sound signal by −8 dB.

In some embodiments, panel 305 transitions 310 to panel 315 over time as the audio system updates the ranking of the sound sources A, B, C, and D. For example, a user of the audio system may divert their gaze away from sound source A and begin to gaze at sound source C. As such, the audio system updates the ranking and positions sound source A and sound source C to have equal ranking (i.e., both sound source A and sound source C have the highest rank). The audio system may apply a similar filter to the sound signal corresponding to sound source A and to the sound signal correspond to sound source C applying the least amount of suppression. Thus, both sound signals are attenuated by 0 dB.

In some embodiments, panel 315 transitions 320 to panel 325 over time as the audio system updates the ranking of the sound sources A, B, C, D. For example, the user of the audio system continues to gaze at sound source C. The audio system updates the ranking such that sound source C has a highest rank, sound source A is next highest, the remaining sound sources (sound source B and sound source D) have the same rank. The filters applied by the audio system update such that the sound signal corresponding to sound source A is attenuated by −8 dB and the sound signals corresponding to sound source B and sound source D are attenuated by −12 dB.

In some embodiments, panel 315 transitions 330 to panel 305. For example, the user may return their gaze back to sound source A. As such, the ranking of the sound sources reverts back to the original ranking of sound source A being ranked in the highest-ranked position followed by sound source B, sound source C, and sound source D, respectively.

Figure 4:
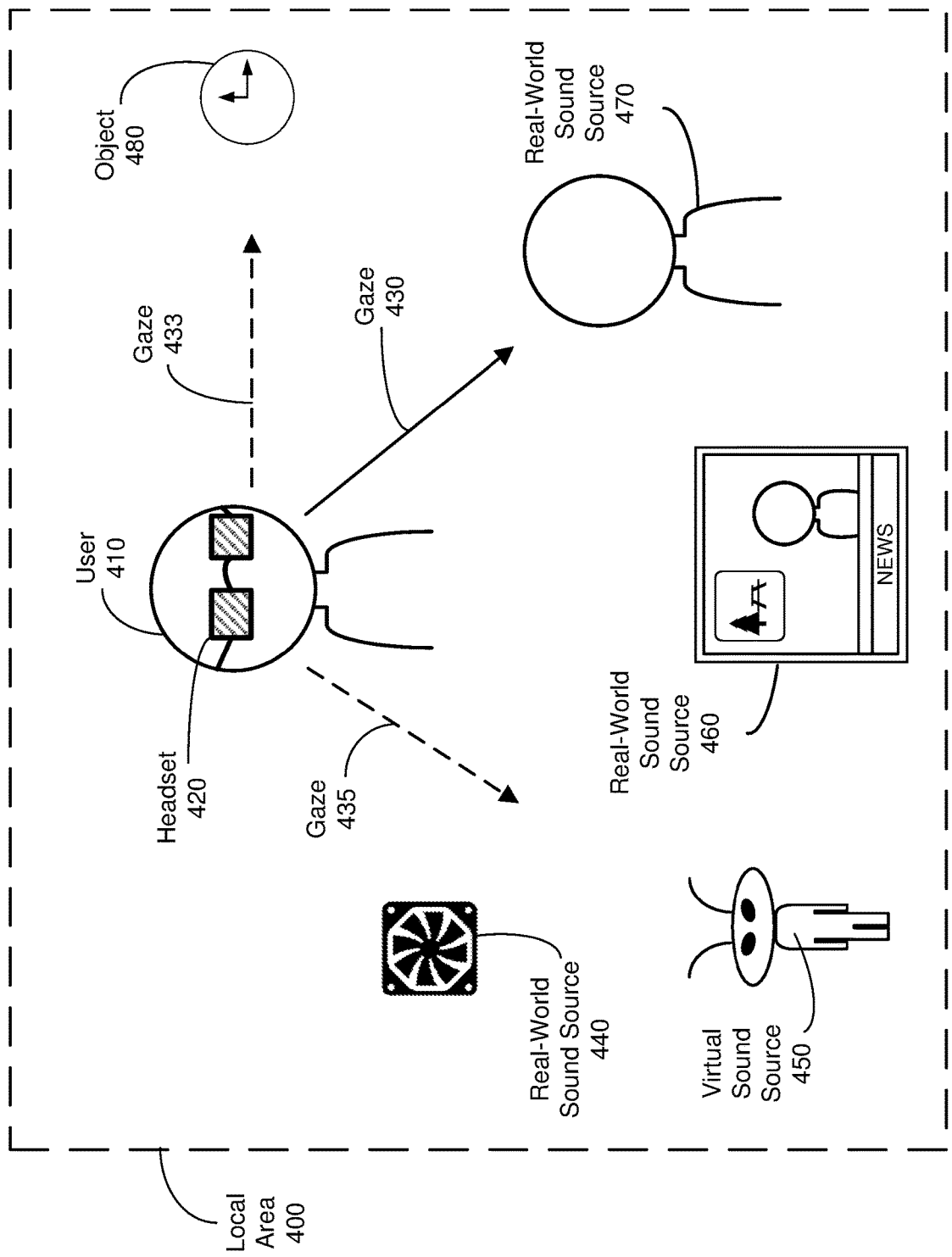
FIG. 4 is an example of a local area including one or more sound sources, in accordance with one or more embodiments.

FIG. 4 is an example of a local area 400 including one or more sound sources, in accordance with one or more embodiments. The local area 400 includes a user 410 wearing a headset 420 in proximity to a plurality of sound sources (e.g., a real-world sound source 440, a virtual sound source 450, a real-world sound source 460, and a real-world sound source 470). The real-world sound source 440 is depicted as a mechanical device, the virtual sound source 450 is depicted as an extraterrestrial, the real-world sound source 460 is depicted as a television, and the real-world sound source 470 is depicted as another person.

In some embodiments, the headset 420 may be the headset 100 of FIG. 1A or the headset 105 of FIG. 1B. In one embodiment, the user 410 may also wear an in-ear device (not shown) that may be an embodiment of the in-ear devices 185 of FIG. 1A and FIG. 1B. The plurality of sound sources may collectively produce sound that may be incoherent when listened to all at once for a user 410. In some embodiments, the sound produced by real-world sound source 460 may be indistinguishable from the sound produced by real-world sound source 470 to the user 410. The audio system may generate one or more filters to apply to the sound emitted by any or all of the sound sources 440, 450, 460, 470 to enhance the audio content presented to the user 410.

An audio system (e.g., the audio system 200) of the headset 420 identifies the sound sources of interest to the user (e.g., sound sources 450, 460, 470) based on a model of the local area 400 and/or based on user input as described above with reference to FIG. 2. The audio system of the headset 420 ranks the identified sound sources of interest based on implicit feedback provided by the user (e.g., based on a gaze vector) included in the model of the local area 400. A current gaze vector 430 is determined to be directed towards the position of the real-world sound source 470, and the audio system ranks this particular sound source in a highest rank. The audio system may update the ranking of the sound sources of interest to the user based on updates to the model of the local area 400. For example, if the user 410 subsequently directs their gaze 435 towards the virtual sound source 450, the audio system may position the virtual sound source 450 to have equal rank with the real-world sound source 470. If the user 410 continues to gaze 435 towards the virtual sound source 450, the audio system maintains the virtual sound source 450 in the highest rank and decreases the ranking of the real-world sound source 470 to the next highest rank. In a different example, if the user 410 directs their gaze 433 towards an object 480 in the local area, the audio system does not update the ranking of sound sources as the object 480 is not an identified sound source of interest.

The audio system of the headset 420 applies one or more filters to one or more sound signals prior to presenting audio content to the user 410. In an embodiment where the real-world sound source 470 has the highest rank followed by the real-world sound source 460 in the next highest rank followed by the virtual sound source 450 in the lowest rank, the audio system applies a filter to a sound signal corresponding to the real-world sound source 470 that may enhance sound from the real-world sound source 470 greater than a filter applied to a sound signal corresponding to the real-world sound source 460. And, the audio system applies a filter to a sound signal corresponding to the virtual sound source 450 that may enhance sound from virtual sound source 450 less than the filter applied to the sound signal corresponding to the real-world sound source 460. The one or more filters may be applied to the sound signals via the headset 420 and/or via in-ear devices (not shown) worn by the user 410. The augmented audio data (i.e., the one or more sound signals after filter application) are such that the user 410 may now be able to distinguish between the sound sources 450, 460, 470 more easily. Also, in the same embodiment, the user 410 may hear the real-world sound source 470 more easily while still hearing the real-world sound source 460 and the virtual sound source 450.

FIG. 5 is a flowchart illustrating a process 500 for augmenting audio data for presentation to a user, in accordance with one or more embodiments. The process shown in FIG. 5 may be performed by components of an audio system (e.g., audio system 200). Other entities may perform some or all of the steps in FIG. 5 in other embodiments. Embodiments may include different and/or additional steps or perform the steps in different orders.

The audio system receives 510 sound signals corresponding to sounds from sound sources in a local area. In some embodiments, the audio system captures sound using one or more microphones coupled to a frame of a headset worn by a user. In some embodiments, the audio system receives sound signals from one or more external microphones (e.g., microphones positioned around the local area).

The audio system updates 520 a ranking of the sound sources based in part on eye tracking information of the user. For example, the user may divert their gaze from a first sound source to a second sound source. The audio system may update the ranking of the sound sources to include the first sound source and second sound source to be of equal rank. The audio system may further update the ranking if the user continues to gaze at the second sound source for at least a threshold amount of time (e.g., for at least 1.5 seconds). If the user does continue to gaze at the second sound source for at least the threshold amount of time, the audio system updates the ranking of the second sound source to have the highest rank and the first sound source to have the next highest rank. In some embodiments, the audio system may adjust the rank of the other sound sources accordingly by when a new sound source (i.e., not the current highest-ranked sound source) takes over the highest-ranked position. In some embodiments, the audio system may update the ranking of the sound sources based on a previously highest-ranked sound source emitting sound regardless of the current gaze of the user. In some embodiments, the audio system may update the ranking of the sound sources based on one or more identified gestures of persons or persons wearing headsets in the local area. In some embodiments, the audio system may update the ranking as a user enters a new local area where the ranking of sound sources corresponding to the previous local area may be purged and a new ranking may be generated. Thus, the ranking of sound sources is updated by the audio system only when certain conditions are met (e.g., the user continues to gaze at a different sound source than the current highest-ranked sound source) providing a persistence to the ranking of the sound sources.

The audio system selectively applies 530 one or more filters to one or more of the sound signals according to the ranking to generate augmented audio data. In some embodiments, the audio system may apply a filter to a sound signal that corresponds to higher-ranked sound sources that enhance (amplify) their corresponding sound signals, that attenuates their corresponding sound signals, or some combination thereof. The filters applied to each rank may enhance and/or attenuate sound signals differently. For example, the amount of attenuation applied to a sound signal is dependent upon the rank of the corresponding sound source where lower ranked sound sources receive more attenuation. In some embodiments, the audio system may apply a filter to sound signals that correspond to sound sources identified as not of interest to the user that suppress these sound signals. The filters applied by the audio system may be based on a sound profile of the user. In some embodiments, the audio system may determine to apply a filter that spatializes one or more sound signals associated with the ranked sound sources based on the model of the local area such that the re-broadcast sound appears to originate at the ranked sound source locations. The augmented audio data includes the one or more sound signals post-filter application to be rebroadcast by the audio system.

The audio system provides 540 the augmented audio data to a speaker assembly for presentation to a user. In one embodiment, the augmented audio data is provided to a speaker assembly of an in-ear device worn by the user. In another embodiment, the augmented audio data is provided to a speaker assembly of the headset.

In some embodiments, the audio system provides the one or more filters to in-ear devices. The in-ear devices generate the augmented audio data by applying the one or more filters to the sound signal.

The processing and computations performed by the audio system (e.g., the ranking of the sound sources, the selective application of one or more filters to one or more sound signals, etc.) allows for improved enhancement to audio content presented to the user. For example, a user may be struggling to hear the sound sources of interest to them (e.g., the user may be suffering from hearing loss, the user may be within a local area that has a multitude of loud sound sources, or some combination of both). The user may benefit from the audio system ranking the sound sources of interest to the user based on user input (e.g., based on implicit user input), updating the ranking as the user input changes, and applying one or more filters to one or more sound signals based on the ranking. Thus, sounds emitted by sound sources of interest to the user may be enhanced (amplified) based on the ranking and/or sounds emitted by sound sources of interest to the user may be suppressed based on the ranking. For example, a sound emitted by a highest-ranked sound source is re-broadcast to the user without any filter being applied, whereas, a sound emitted by any lower-ranked sound source is re-broadcast to the user after being attenuated. Also, the processing and computations performed by the audio system allows the in-ear devices to present enhanced audio content to the user.

Figure 6:
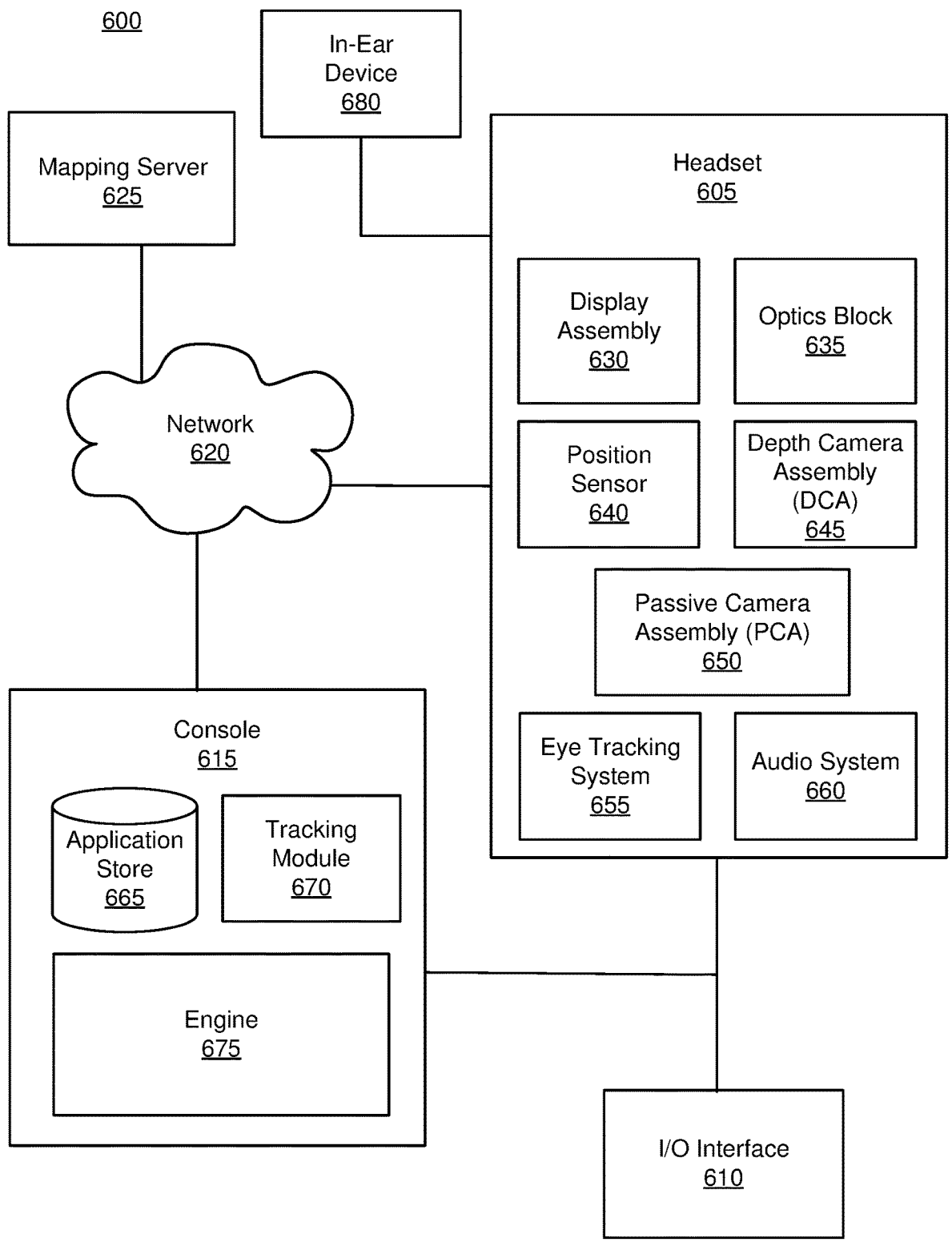
FIG. 6 is a system that includes a headset and one or more in-ear devices, in accordance with one or more embodiments.

FIG. 6 is a system 600 that includes a headset 605 and optionally includes one or more in-ear devices, in accordance with one or more embodiments. In some embodiments, the headset 605 may be the headset 100 of FIG. 1A or the headset 105 of FIG. 1B. The system 600 may operate in an artificial reality environment. The system 600 shown by FIG. 6 includes the headset 605, an input/output (I/O) interface 610 that is coupled to a console 615, a network 620, and a mapping server 625. The system 600 may also include one or more of the in-ear devices 680. While FIG. 6 shows an example system 600 including one headset 605, one I/O interface 610, and one in-ear device 680, in other embodiments any number of these components may be included in the system 600. For example, there may be two in-ear devices communicating with an associated headset. The in-ear device 680 may be the in-ear device 185 of FIG. 1A or the in-ear device 185 of FIG. 1B. In another example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes a display assembly 630, an optics block 635, one or more position sensors 640, a DCA 645, a PCA 650, an eye tracking system 655, and an audio system 660. Some embodiments of headset 605 have different components than those described in conjunction with FIG. 6. Additionally, the functionality provided by various components described in conjunction with FIG. 6 may be differently distributed among the components of the headset 605 in other embodiments or be captured in separate assemblies remote from the headset 605.

The display assembly 630 displays content to the user in accordance with data received from the console 615. The display assembly 630 displays the content using one or more display elements (e.g., the display elements 120). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating positional information about the headset 605. The position sensor 640 may generate one or more measurement signals in response to motion of the headset 605. The position sensor 640 is an embodiment of the position sensor 190. Examples of a position sensor 640 include: one or more IMUS, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605. Further operation of the position sensor 640 is described above with regard to FIG. 1A.

The DCA 645 generates depth information for a portion of the local area. The DCA includes one or more imaging devices and a DCA controller. The DCA 645 may also include an illuminator. Operation and structure of the DCA 645 is described above with regard to FIG. 1A.

The PCA 550 generates color image data for the local area. The PCA may include one or more imaging devices that capture images of some or all of the local area. In some embodiments, the PCA 550 may capture images of one or more sound sources (including the user) in the local area. Further description about the operation and structure of the PCA 550 is described above with regard to FIG. 1A.

The eye tracking system 655 determines eye tracking information associated with an eye of the user wearing the headset 605. The eye tracking information determined by the eye tracking system 655 may include, e.g., gaze information. In some embodiments, the eye tracking system 655 determines pupillometry information such as pupil size and reactivity. The gaze information and/or the pupillometry information may be used to determine where a user is looking. The eye tracking system 655 may utilize one or more imaging devices to track the eye(s) of the user. Further operation of the eye tracking system is described above with regard to FIG. 1A.

The audio system 660 selectively applies one or more filters to one or more sound signals. The audio system 660 is substantially the same as the audio system 200 described above. The audio system 660 may comprise one or more microphones, one or more transducers, and an audio controller. In some embodiments, the audio system may identify one or more sound sources of interest to the user. The audio system may update a ranking of sound sources of interest to the user based in part on eye tracking information of the user. The audio system selectively applies the one or more filters to one or more sound signals based on the ranking to generate augmented audio data. The augmented audio data includes one or more sound signals post-filter application such that sound rebroadcast from a higher-ranked sound source is enhanced relative to sound rebroadcast from a lower-ranked sound source. The augmented audio data may be presented by the headset 605 via a speaker assembly and/or presented by the in-ear device 680.

The I/O interface 610 is a device that allows a user to provide information, send action requests to the console 615, and receive responses from the console 615. The user may provide information (e.g., a sound profile of the user) to be stored in the audio system 660. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 665, a tracking module 670, and an engine 675. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 665 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 670 tracks movements of the headset 605 using information from the one or more position sensors 640. For example, the tracking module 670 determines a position of a reference point of the headset 605 in a mapping of a local area based on information from the headset 605. Additionally, in some embodiments, the tracking module 670 may use portions of data indicating a position of the headset 605 from the position sensor 640 as well as representations of the local area from the DCA 645 to predict a future location of the headset 605. The tracking module 670 provides the estimated or predicted future position of the headset 605 to the engine 675.

The engine 675 executes applications and receives position information, acceleration information, velocity information, predicted future positions, or some combination thereof, of the headset 605 from the tracking module 670. Based on the received information, the engine 675 determines content to provide to the headset 605 for presentation to the user. For example, if the received information indicates that the user has looked to the left, the engine 675 generates content for the headset 605 that mirrors the user's movement in a virtual local area or in a local area augmenting the local area with additional content. Additionally, the engine 675 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 620 couples the headset 605 and/or the console 615 to the mapping server 625. The network 620 may include any combination of local area and/or wide area networks using both wireless and/or wired communication systems. For example, the network 620 may include the Internet, as well as mobile telephone networks. In one embodiment, the network 620 uses standard communications technologies and/or protocols. Hence, the network 620 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 620 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 620 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 625 may include a database that stores a model describing a plurality of spaces, wherein one location in the model corresponds to a current configuration of a local area of the headset 605. The mapping server 625 receives, from the headset 605 via the network 620, information describing at least a portion of the local area and/or location information for the local area. The mapping server 625 determines, based on the received information and/or location information, a location in the model that is associated with the local area of the headset 605. The mapping server 625 determines (e.g., retrieves) one or more acoustic parameters associated with the local area, based in part on the determined location in the model and any acoustic parameters associated with the determined location. The mapping server 625 may transmit the location of the local area and any values of acoustic parameters associated with the local area to the headset 605.

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving sound signals corresponding to sounds from sound sources in a local area, the sound sources including a first sound source, a second sound source, and a third sound source, wherein in a ranking of the sound sources the first sound source has a higher ranking than the second source and the second sound source has a higher ranking than the third sound source;
   determining a gaze of the user is directed towards the third sound source for an amount of time;
   responsive to determining that the amount of time is less than a threshold amount of time, updating the ranking of the third sound source to be of equal ranking to that of the first sound source and maintain the ranking of the second sound source;
   selectively applying one or more filters to one or more of the sound signals according to the ranking to generate augmented audio data; and
   providing the augmented audio data to a speaker assembly for presentation to the user, wherein the augmented audio data is such that sound rebroadcast from a higher-ranked sound source is enhanced relative to sound rebroadcast from a lower-ranked sound source, and an amount of enhancement is the same for sound sources of equal rank.

2. The method of claim 1, further comprising:
   determining the gaze of the user is directed towards the third sound source for an amount of time; and
   responsive to determining that the amount of time is greater than or equal to the threshold amount of time, updating the ranking of the third sound source, the first sound source, and the second sound source such that the third sound source has a higher ranking than the first sound source, and the first sound source has a higher ranking than the second sound source.

3. The method of claim 1, wherein the sound sources are a subset of a plurality of sound sources in the local area, and the method further comprising:
   receiving sound signals corresponding to sounds from the plurality of sound sources in the local area;
   receiving captured images corresponding to the plurality of sound sources in the local area; and
   analyzing the received sound signals and the received captured images to identify the sub set.

4. The method of claim 1, wherein the sound sources are a subset of a plurality of sound sources in the local area, and the method further comprising identifying the subset based in part on a user input.

5. The method of claim 1, further comprising:
   determining a location for each of the sound sources in the local area; and
   wherein selectively applying one or more filters to one or more of the sound signals according to the ranking to generate augmented audio data comprises:
      for each sound signal, applying, a spatialization filter to generate augmented audio data that is spatialized.

6. The method of claim 1, wherein the speaker assembly is part of an in-ear device worn by the user.

7. The method of claim 6, wherein the sounds from sound sources are detected via a microphone array coupled to a frame of a headset, the headset is separate from and communicatively coupled to the in-ear device.

8. The method of claim 1, wherein the speaker assembly is part of a headset device worn by the user.

9. A system comprising:
   one or more microphones coupled to a frame of a headset, the one or more microphones configured to capture sound emitted by sound sources in a local area; and
   an audio controller integrated into the headset and configured to:
      receive sound signals, from the one or more microphones, corresponding to sounds emitted by sound sources in the local area, the sound sources including a first sound source, a second sound source, and a third sound source, wherein in a ranking of the sound sources the first sound source has a higher ranking than the second sound source and the second sound source has a higher ranking than the third sound source,
      determine a gaze of the user is directed towards the third sound source for an amount of time,
      responsive to determining that the amount of time is less than a threshold amount of time, update the ranking of the third sound source to be of equal ranking to that of the first sound source and maintain the ranking of the second sound source,
      selectively apply one or more filters to one or more of the sound signals according to the ranking to generate augmented audio data, and
      provide the augmented audio data to a speaker assembly, wherein the augmented audio data is such that sound rebroadcast from a higher-ranked sound source is enhanced relative to sound rebroadcast from a lower-ranked sound source, and an amount of enhancement is the same for sound sources of equal rank.

10. The system of claim 9, wherein the audio controller is further configured to:
    determine the gaze of the user is directed towards the third sound source for an amount of time; and
    responsive to the determination that the amount of time is greater than or equal to the threshold amount of time, update the ranking of the third sound source, the first sound source, and the second sound source such that the third sound source has a higher ranking than the first sound source, and the first sound source has a higher ranking than the second sound source.

11. The system of claim 9, wherein the sound sources are a subset of a plurality of sound sources in the local area, and the audio controller is further configured to:
    receive sound signals corresponding to sounds from the plurality of sound sources in the local area;

receive captured images corresponding to the plurality of sound sources in the local area; and analyze the received sound signals and the received captured images to identify the subset.

12. The system of claim 9, wherein the sound sources are a subset of a plurality of sound sources in the local area, and the audio controller is further configured to identify the subset based in part on a user input.

13. The system of claim 9, wherein the audio controller is further configured to:

determine a location for each of the sound sources in the local area; and for each sound signal, apply, a spatialization filter to generate augmented audio data that is spatialized.

14. The system of claim 9, wherein the one or more microphones, the audio controller, and the speaker assembly are integrated on a headset device worn by the user.

15. The system of claim 9, wherein the speaker assembly is part of an in-ear device worn by the user.

16. A non-transitory computer-readable storage medium storing instructions that, when executed by one or more processors, cause the one or more processors to perform operations comprising:

receiving sound signals corresponding to sounds from sound sources in a local area, the sound sources including a first sound source, a second sound source, and a third sound source, wherein in a ranking of the sound sources the first sound source has a higher ranking than the second source and the second sound source has a higher ranking than the third sound source;

determining a gaze of the user is directed towards the third sound source for an amount of time;

responsive to determining that the amount of time is less than a threshold amount of time, updating the ranking of the third sound source to be of equal ranking to that of the first sound source and maintain the ranking of the second sound source;

selectively applying one or more filters to one or more of the sound signals according to the ranking to generate augmented audio data; and providing the augmented audio data to a speaker assembly for presentation to the user, wherein the augmented audio data is such that sound rebroadcast from a higher-ranked sound source is enhanced relative to sound rebroadcast from a lower-ranked sound source, and an amount of enhancement is the same for sound sources of equal rank.

17. The non-transitory computer-readable storage medium of claim 16, wherein the operations further comprise:

determining the gaze of the user is directed towards the third sound source for an amount of time; and responsive to determining that the amount of time is greater than or equal to the threshold amount of time, updating the ranking of the third sound source, the first sound source, and the second sound source such that the third sound source has a higher ranking than the first sound source, and the first sound source has a higher ranking than the second sound source.

* * * * *

UNITED STATES PATENT AND TRADEMARK OFFICE
CERTIFICATE OF CORRECTION

PATENT NO. : 11,290,837 B1
APPLICATION NO. : 17/078335
DATED : March 29, 2022
INVENTOR(S) : William Owen Brimijoin, II It is certified that error appears in the above-identified patent and that said Letters Patent is hereby corrected as shown below:

In the Claims

In Column 29, Claim 3, Line 67, delete "sub set." and insert -- subset. --, therefor.

Signed and Sealed this
Twelfth Day of July, 2022

*Katherine Kelly Vidal*

Katherine Kelly Vidal
*Director of the United States Patent and Trademark Office*